B. M. SMALLEY

SECONDARY RACK AND METHOD OF MAKING THE SAME

Jan. 13, 1931. Re. 17,931

Original Filed Nov. 5, 1924 2 Sheets-Sheet 1

Witnesses:
W. F. Kilroy
Harry R. L. White

Inventor:
Burton M. Smalley
Brown Boucher & Denner
By Attys

B. M. SMALLEY

SECONDARY RACK AND METHOD OF MAKING THE SAME

Jan. 13, 1931. Re. 17,931

Original Filed Nov. 5, 1924 2 Sheets-Sheet 2

Witnesses:
W. P. Kilroy
Harry C. B. White

Inventor:
Burton M. Smalley
Brown Boulden & Dennis
By
Attys

Reissued Jan. 13, 1931

Re. 17,931

UNITED STATES PATENT OFFICE

BURTON M. SMALLEY, OF CHICAGO, ILLINOIS, ASSIGNOR TO JOSLYN MFG. & SUPPLY CO., OF CHICAGO, ILLINOIS, A CORPORATION OF ILLINOIS

SECONDARY RACK AND METHOD OF MAKING THE SAME

Original No. 1,592,840, dated July 20, 1926, Serial No. 747,997, filed November 5, 1924. Application for reissue filed February 24, 1930. Serial No. 431,035.

My invention relates to line hardware and more specifically to a secondary rack and method of making the same.

Incidentally, my invention provides the solution of an interesting problem in joining a post to a sheet which is applicable for other uses than the particular one to which I have applied it.

In developing the present rack, I was confronted with the problem of providing first a strong and rigid support upon which wires could be mounted and strung through the medium of insulators, and upon which a considerable weight may be put. It is common practice for line men to stand upon devices of this class and such devices must therefore be inherently strong.

The next desideratum is to make the rack smooth and free from exposed sharp edges or corners. It is the practice in stringing lines to draw wires across devices of this kind, and such practice requires the racks to be made so that they will not cause injury to the insulation of the wire or to the wire itself.

Devices of this kind should be made inexpensive because of the quantity required. I propose to make a rack of this kind out of sheet metal, and to this end I have devised a construction and mode of manufacture which are the subject of the present invention.

Preferably, I form a longitudinal crease or fold in a sheet of metal of the desired thickness. Instead of a crease or fold a protuberance or drawn boss may be employed instead. The essential idea is side walls adapted to lie tangent to the post, said side walls being joined by a connecting web. This crease or fold is in the form of an inverted channel. The crease or fold forms a relatively wide ridge, which greatly strengthens the sheet longitudinally, and the sides of this ridge are preferably normal to the plane of the sheet itself, and where the sheet lies flat these sides are preferably vertical and the top of the ridge is preferably substantially horizontal or parallel to the plane of the base. The web or top of the ridge is perforated with round or elliptical apertures to receive the posts which are made of a cross sectional shape similar to the opening through the base. Preferably I make the posts elliptical in cross-section and the apertures of the same shape.

The apertures in the crease or fold are preferably elliptical with their major axis in line with the length of the ridge and preferably the side edge of each opening is substantially tangent with the inside surface of the vertical walls of the ridge.

The posts are then inserted into the holes with as nice a fit as is convenient for rapid assembly. Then a rivet is passed through the sides of the crease or protuberance and through the hollow post to draw these parts together. This rivet results in a drawing together of the sides of the crease and a pressure of the same upon the sides of the post with the result that there is a decrease in the length of the minor axis of the hole without any increase of the length of the major axis. In other words, the opening becomes smaller through the down folding of the sides. The same pressure which collapses the hole tends to deform the post, and the resultant action is a shortening of the length of the minor axis of the cross section of the post, and at the same time, a tendency to increase the length of the major axis of the cross section of the post. These two tendencies which are brought about by the pressure of the rivet, result in a complete filling of the hole by the post through the mere drawing up or tensioning of the rivet. After the post is in place, it is then supported at the edge of the hole and by the rivet in shear, and due to the excellent fit which is obtained, a very solid and substantial structure results.

I am aware that each of these tendencies alone operates to secure a firm fit; for example, the post may remain undisturbed and the mere collapsing of the hole about it is sufficient to secure the desired fit, or a deformation of the post without disturbing the sheet might be resorted to, to secure the desired fit at the edges of the major axis of the hole.

Now, in order to acquaint those skilled in the art with the manner of constructing and operating a device according to my invention, I shall describe in connection with the accompanying drawings a specific embodiment of the invention.

In the drawings:—

Fig. 6 is a similar view of the same after it has been creased or formed;

Figure 3:
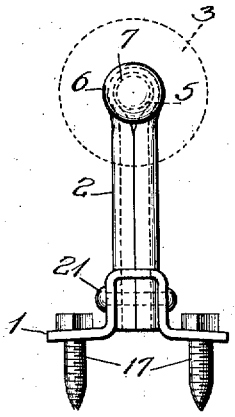
Fig. 3 is an elevational view.
Figure 4:
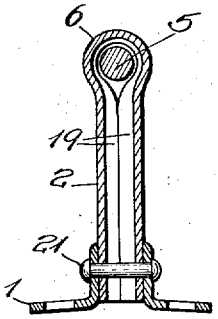
Fig. 4 is a cross section taken on the line 4—4 of Fig. 1.
Figure 2:
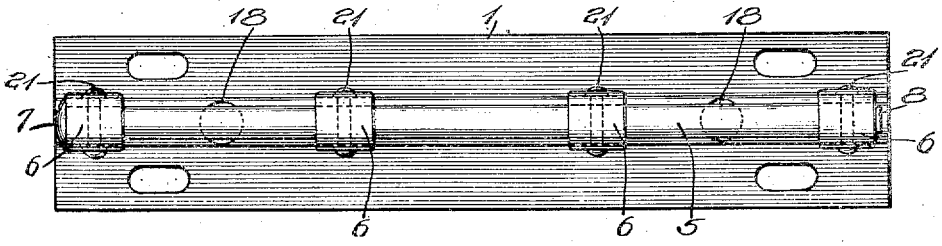
Fig. 2 is a plan view of the same.
Figure 1:
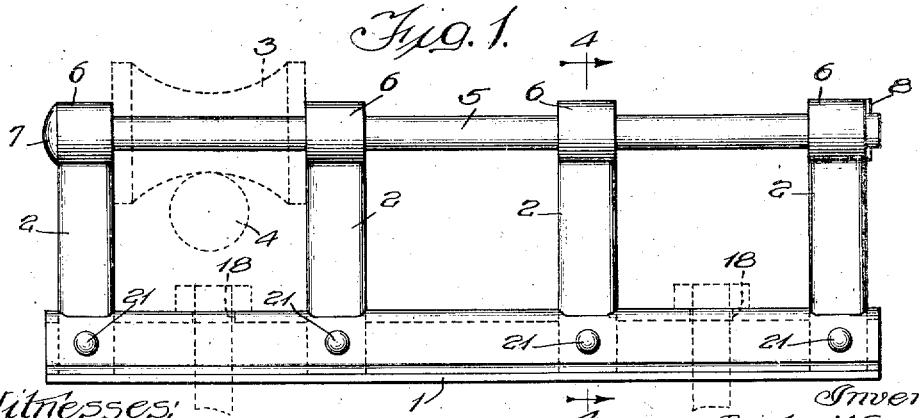
Fig. 1 is a side elevational view of a device embodying my invention.

In the construction of a device such as shown in Figs. 1 to 4, I form the rack of sheet metal, the essential parts being a base 1, shown in Figs. 1 to 4, and one or more posts 2 secured to said base for supporting through insulators, such as shown at 3, one or more line wires indicated at 4. The insulators may be mounted as shown upon a common rod 5 passing through the loops or eyes 6 formed in the upper ends of the posts 2, or the individual posts may bear separate insulators if so desired. This phase of the invention is optional and I have illustrated merely the preferred form in which my invention may appear. The rack is generally mounted in vertical position, and the rod 5 is therefore provided with a head 7 and held in place by a cotter pin 8, the insulator 3 being strung between the posts 2, as shown in Fig. 1.

Figure 5:
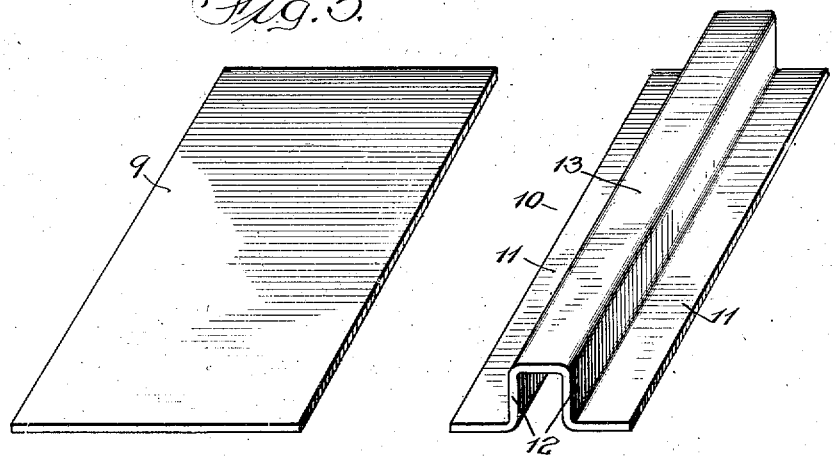
Fig. 5 is an isometric view of the base plate before forming and punching.
Figure 7:
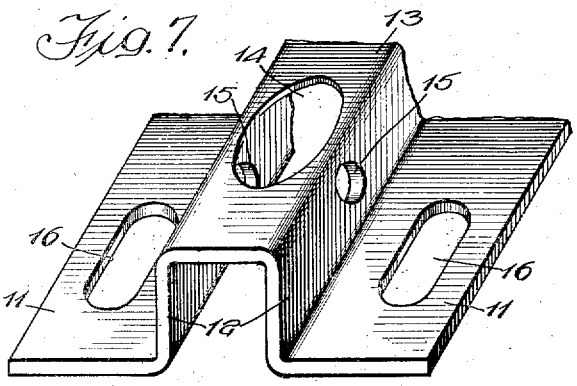
Fig. 7 is a fragmentary isometric view showing a section of the base after it is formed and punched.

I construct the base member out of a rectangular sheet of metal, such as shown at 9 in Fig. 5. This sheet may be separately formed or may be formed as part of a continuous sheet into the base member 10, shown in Fig. 6, which consists of base flanges 11 and a central crease or inverted channel having the substantially vertical side walls 12 and a top wall or web 13 between said side walls 12. The sheet 9 may be creased or grooved, as shown in Fig. 6, either by stamping, rolling or like metal working operation, which is not of the essence of the present invention. I have secured excellent results by rolling the sheet into the desired channel form. The base flanges 11 are flat and lie in substantially the same plane, namely, the original plane of the sheet 9. The top of the ridge is substantially parallel to the base flanges 11, although this part is preferably slightly crowned, both because of the ease of manufacture in such shape, and also because of the more convenient collapse of the side walls 12 against the the sides of the posts 2, as will be described later.

After the base is formed, as shown in Fig. 6, it it is then punched to provide, first, the openings 14 in the top of the ridge in the wall 13, next the rivet holes 14 in the side walls 12, and also, the slots 16 in the base flanges 11. The slots 16 are adapted to receive bolts, such as are indicated at 17 in Fig. 3, and, if desired, additional holes may be formed as indicated at 18 in Fig. 2, in the top wall 13 of the ridge.

Figure 8:
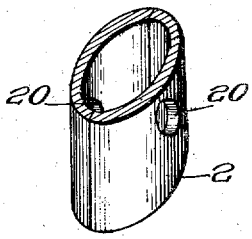
Fig. 8 is a fragmentary sectional view of the bottom part of the post, the same being adapted to fit into the aperture in the base.

The posts 2 are formed of sheet metal strips shaped into channel form and then folded together to form the eyes 6, the end walls or legs 19 of the channels being cut away at the eye 6 in order to reduce the diameter of the outside of the eye and to make manufacture simpler. The lower parts of the posts are punched to provide holes 20, as shown in Fig. 8.

It will be observed that the post is thereby made hollow, and that the shape of the post is substantially the same shape as the hole 14 into which it fits, and also that the hole and post are generally elliptical in outline. It is not essential that they be elliptical in outline,—they might be truly circular or approximately circular, but since the device is preferably mounted in a vertical direction, the maximum moment of inertia of the post should be in a vertical direction, that is, in the direction of a length of the ridge to sustain the weight of a lineman stepping upon the same.

Figure 9:
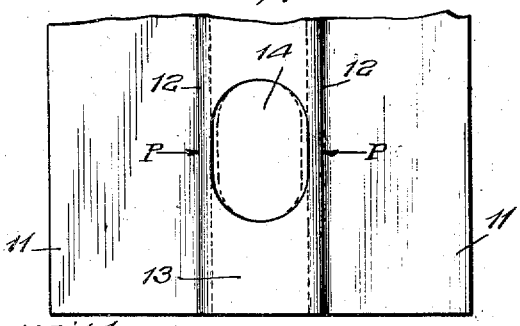
Fig. 9 is a diagrammatic plan view of the base.

The posts 2 are introduced into the openings 14 as snug a fit being provided as is permissible for rapid and convenient assembly; rivets 21 and then inserted into the holes 15 and 20, and the rivets are then drawn tight. This action of drawing the rivets tight secures a novel action which is highly desirable and which is an important part of my invention. The pressure of the rivet heads is placed upon the side walls 12 of the crease or fold, and this tends to arch up the top wall 13 to a slightly greater extent. In so doing, the sides 12 approach each other with the result that the crosswise or minor axis dimension of the aperture 14 is decreased without any change in the longitudinal dimension or major axis of the opening 14. This action is illustrated in Fig. 9 where the dotted lines indicate what happens when pressure is brought upon the side walls 12—12, as indicated by the arrows P.

Figure 10:
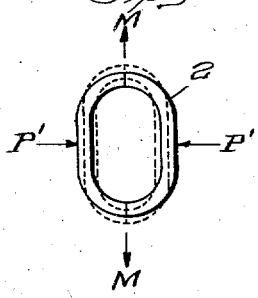
Fig. 10 is a diagrammatic plan view of the bottom part of the post.

Now, as soon as the side walls bring pressure upon the flat sides of the posts 2 adjacent the rivet holes 20 this inward pressure, as indicated by the arrows P′ in Fig. 10, tend to collapse the sides of the posts towards each other and to push out the ends as indicated by the dotted lines and to press these ends into firm engagement with the edges of the opening 14, as indicated by the arrows M.

It will be noted that the edges of the walls 19 of the channel are in engagement and pressure upon the sides merely tends to force these edges out in the direction indicated by the arrows M in Fig. 10. The result is, that the post completely fills the aperture and the side walls of the crease fit firmly upon the side walls of the post under the tension of the rivet 21. Thus, the simple tensioning of the rivet 21 secures the highly advantageous and complex action above described. The rivet 21 is placed in shear when any weight is put upon the same, and because of the nice fit and the internal bracing which is secured, the device is very strong for its weight. It will be apparent that the device is inexpensive to manufacture and highly efficient in action. While I have described a hollow post, I do not intend to limit the invention to a hollow post, although, for the sake of lightness in weight and cheapness in manufacture, and also for the ease of securing the desired collapsing action, a hollow post is desirable.

I do not intend to be limited to the details shown or described, as there may be wide variation in the form, shape and materials embodying the invention. The principle which I have disclosed and the structure which it secures are, I believe, fundamentally new, and I intend to claim the same broadly.

I claim:

1. In a device of the class described, a base having an upper longitudinal wall and lower extending flanges in a plane substantially parallel to said upper longitudinal wall and having two substantially parallel longitudinal walls joining the edges of the upper wall with the inner edges of the lower flanges, and lying at substantially right angles to said flanges, said upper wall having a hole therethrough of substantially the full width of said upper wall, a hollow post lying in said hole and means for drawing said substantially parallel walls together upon the post to cause the post to expand in a direction generally at right angles thereto to cause the post to engage firmly with the edges of the hole in a direction longitudinal of the upper wall.

2. In a device of the class described, a base member having a longitudinal fold therein forming a channel, there being a hole formed in the web of the channel of substantially the full width of said web, a hollow post set into said hole, and means for drawing the sides of the channel against each other to expand the post into engagement with the edges of the hole.

3. The method of fastening a hollow post into a metal sheet which comprises folding the sheet longitudinally to form a gutter of the internal width of the post, forming an opening in the bottom of the gutter to receive the post and then compressing the sides of the gutter upon the sides of the post thereby decreasing the width of the opening, simultaneously decreasing the corresponding diameter of the post, and simultaneously increasing the diameter of the post in a direction at right angles thereto.

4. The method of fastening a post to a base member which comprises bending the base member into the form of a longitudinal fold, cutting a hole through the bottom of the fold of substantially the full width thereof and of the size of the post, collapsing the sides of the fold upon the sides of the post to expand the post into contact with the edges of the hole.

5. The method of mounting a hollow post in a transverse hollow base, which comprises cutting a hole in the hollow base of substantially the full width of the interior of the hollow base and collapsing the sides of the hollow base upon the hollow post to bring the sides of the post into engagement with the edges of the hole by transverse expansion.

6. In a device of the class described, a sheet metal plate having an inverted longitudinal gutter, the side walls of said gutter being substantially parallel, there being an oblong hole through the web of the gutter, the hole having substantially the same width as the web of the gutter, a hollow sheet metal post of oblong cross section formed of two cooperating halves or gutter sections and fitting into said hole in the web of the gutter, the webs of the gutter sections of which said post is constructed lying flat against the side walls of the gutter of the plate and a rivet passing through the side walls of the plate and a rivet passing through the side walls of the main gutter and through said webs of the gutter sections and collapsing said parts to the point of bringing the edge of the gutter sections into firm engagement with the adjacent edges of the hole.

7. In a device of the class described, a base comprising a pair of substantially parallel longitudinal walls with a joining wall between them, said joining wall having a hole therethrough of substantially the full width of the joining wall, a hollow tubular post of oblong cross section and rounded corners fitting into said hole and having its longer sides substantially in contact with the inner surfaces of the parallel walls and a rivet passing through the parallel walls and through the side walls of the post and drawing the parts firmly together.

8. In combination a base member having substantially parallel side walls and a web joining said side walls, said web having an opening of substantially the full width of the web, a hollow tubular post fitting in said hole in the web and a rivet for drawing the side walls of the base member upon the adjacent side walls of the post to expand the non-adjacent side walls of the post into engagement with the edges of the hole.

9. In a device of the class described, a sheet metal base having a longitudinal channel creased therein, there being holes in the web of the channel, hollow tubular posts fitting the holes, rivets through the sides of the channel and through the posts holding the parts firmly in engagement against movement in all directions and a pin passing through the ends of the posts.

10. In combination, a sheet having a crease therein forming a channel, a post projecting through the web of the crease and being tangent to the inner side of the side walls of the crease, and a tension element extending through the side walls of the crease and the side walls of the post.

11. In combination, a sheet having an integral lateral fold, and having a hole in the top wall of the fold, a post one end of which is set in said hole and lying tangent to the inner side walls of the fold, and means for holding said side walls of the fold against the post, said post extending outward of the fold and supported solely at said one end as a cantilever.

12. In combination, a sheet having a crease therein forming an inverted channel, and a post projecting through the top wall of the crease at right angles to the web of the channel and being tangent to the inner sides of the side walls of the crease, said post being secured to said side walls below the edges of said top wall and constituting a cantilever load sustaining means.

13. The method of fitting a hollow post into a hole in a sheet which comprises pressing the margins of the sheet at opposite sides of the hole into engagement with the sides of the post to decrease the diameter of the post in the line of pressure and to increase the diameter of the post at right angles to said line of pressure.

14. The method of fitting a post into a hole in a sheet which comprises folding the sheet on parallel lines tangent to a diameter of the hole against the sides of the post, then pressing said folded parts of the sheet against the sides of the post to compress the post in the line of pressure and to expand it in a direction at substantially right angles to said line of pressure.

15. In a device of the class described, in combination, a base having a longitudinal channel therein, there being holes in the web of the channel, posts set in said holes and tangent to the walls of said channel, means below said web for holding the parts permanently in engagement against movement in all directions, and a pin passing through the ends of said posts.

16. In a device of the class described, in combination, a sheet metal base having a longitudinal channel therein, there being holes in the web of the channel, hollow tubular posts set in said holes and tangent to the walls of said channel, means below the said web for holding the parts in permanent engagement against movement in all directions, and a pin passing through the ends of said posts.

17. In combination, a base comprising a sheet metal plate having a longitudinal crease forming a channel, the margins of the plate forming mounting flanges, there being holes through the web of said channel, said holes being of a width substantially equal to the width of the channel, rigid posts set in said holes and secured to the side walls of the channel to provide cantilever supports for said posts, and a pin threaded through the outer ends of the posts.

18. In combination, a base comprising a metal plate having a longitudinal channel, the margins of the plate forming mounting flanges, there being holes through the web of said channel, rigid posts set in said holes and permanently secured to the channel interiorly thereof to provide cantilever supports for said posts, and a pin threaded through the outer ends of the posts.

19. In combination, a sheet having an integral lateral fold forming a channel, and having a hole in the top wall of the fold, a post one end of which is set in said hole and lying tangent to the inner side walls of the fold, and means for holding said side walls of the fold against the post, said post extending at substantially right angles to the web of the channel and supported solely at said one end as a cantilever.

20. In combination, a sheet having an integral lateral fold, and having a hole in the top wall of the fold, a post having one end set in said hole and lying tangent to the inner side walls of the fold, means for holding said side walls of the fold against the post, and a rod extending loosely through and removably supported by the other end of the post.

21. In combination, a sheet having an integral lateral fold, and having a plurality of spaced holes in the top wall of the fold, posts having one end set in said holes and lying tangent to the inner side walls of the fold, means for holding said side walls of the fold against the post, and a rod removably supported by the other end of said posts.

22. In combination, a sheet having a crease therein forming an inverted channel, and a plurality of posts each having one end projecting through the top wall of the crease and being tangent to the inner sides of the side walls of the crease and at substantially right angles to the web of the channel, said posts being secured at one end to said side walls below the edges of said top wall.

23. In combination, a sheet having a crease therein forming an inverted channel, and a plurality of posts each having one end projecting through the top wall of the crease and being tangent to the inner sides of the side walls of the crease and at subsequently right angles to the web of the channel, said posts being secured at one end to said side walls below the edges of said top wall and the opposite ends of said posts being adapted to support a rod between them and parallel to the web of the channel.

24. In combination, a sheet having a crease therein forming an inverted channel, and a plurality of posts projecting through the top wall of the crease and being tangent to the inner sides of the side walls of the crease and extending at right angles to the web of the channel, said posts being secured to said side walls below the edges of said top wall, and constituting a cantilever support for a rod that extends parallel to the channel.

25. In combination, a sheet having a crease therein forming an inverted channel, and a plurality of spaced posts each having one end projecting through the top wall of the crease and being tangent to the inner sides of the side walls of the crease, said posts being secured at one end to said side walls below the edges of said top wall, and the opposite ends of the posts being adapted to support a rod between them.

In witness whereof, I hereunto subscribe my name this 14th day of February, 1930.

BURTON M. SMALLEY.